July 28, 1925. 1,547,208
M. M. FARMER
HOSE CLAMP
Filed March 15, 1924
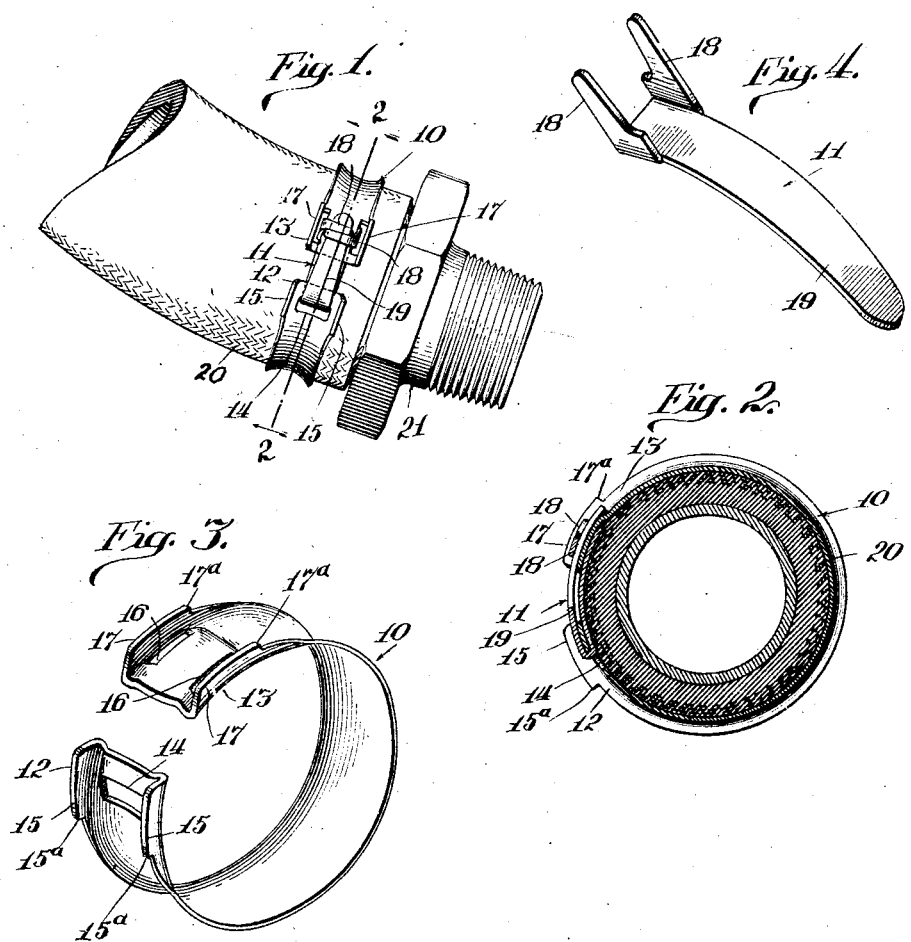
Inventor
Melvin M. Farmer
Attorney Patented July 28, 1925.

1,547,208

UNITED STATES PATENT OFFICE.

MELVIN M. FARMER, OF BLUE ISLAND, ILLINOIS.

HOSE CLAMP.

Application filed March 15, 1924. Serial No. 699,404.

*To all whom it may concern:*

Be it known that I, MELVIN M. FARMER, a citizen of the United States, and a resident of Blue Island, county of Cook, and State of Illinois, have invented certain new and useful Improvements in Hose Clamps, of which the following is a specification.

This invention relates to improvements in hose clamps and consists of the matters hereinafter described and more particularly pointed out in the appended claims.

The primary object of the invention is to provide a simple and efficient clamp for securing the end of a hose to a nipple or the like and which clamp comprises a main body part and a link for connecting and securely locking the two ends of the body part together.

A further object of the invention is to provide a clamp of the kind which may be made and sold at a comparatively low cost and which may be readily applied to a hose end.

These objects of the invention as well as the many advantages thereof will more fully appear as I proceed with my specification.

In the drawings:

Fig. 1 is a view in elevation of hose end to which my improved clamp has been applied for securely attaching said hose end to a nipple;

Fig. 2 is a transverse section through the same, as taken on the line 2—2 of Fig. 1;

Fig. 3 is a perspective view of the main or body part of my improved hose clamp;

Fig. 4 is a perspective view of the secondary part or link of my improved hose clamp before the same has been applied to said main body part.

Referring now in detail to that embodiment of the invention illustrated in Figs. 1 to 4 inclusive, of the accompanying drawings—10 indicates as a whole the main body part of my improved hose clamp and 11 indicates as a whole the secondary part or link which connects the two ends of said body part together.

The body part 10 comprises an annular band of metal which is split or cut away in a plane parallel to its longitudinal central axis to provide two spaced ends 12 and 13, respectively. The said body part is curved or arched transversely outward to strengthen and stiffen the same and at the same time to prevent the opposite edges thereof from wearing into and rupturing the outer covering of the hose.

In the end 12 of the main body part is provided a transverse slot 14 and that part of said end beyond said slot is depressed outwardly, as shown in Fig. 2. To strengthen said end, the lateral margins thereof beyond the ends of the slot 14 are bent to provide radially extending flanges 15.

In the other end 13 of said main body part are provided two spaced circumferential slots 16—16 on each side of which are flanges 17—17 similar to the flanges 15 before mentioned. In said flanges 15 and 17 are provided opposed shoulders $15^a$—$17^a$ respectively to be engaged by a suitable tool to draw said ends together in applying the clamp to a hose end.

The secondary or connecting member 11 comprises an elongated link or strip of sheet metal which is of a width substantially equaling that of the slot 14. Said link is curved longitudinally at one end and is there provided with two radially disposed ears 18—18 which are adapted to be inserted through the slots 16—16 in the body end 13 while the other end of the link is tapered transversely as at 19 to provide a tongue which will easily enter the slot 14 in the other end 12 of the main body member 10.

To apply the hose clamp above described, the tapered end 19 is inserted into the slot 14 from the inside of the end 12 and is extended therethrough until the ears 18—18 register with and can be entered into the slots 16—16 from the inside of the other end 13 of said main body part. The two parts thus connected are slipped over the end 20 of a hose and a nipple 21 then screwed or "worked" into said hose end in the usual manner. A tool is next used which will engage the shoulders $15^a$ and $17^a$ to draw the ends 12 and 13 together.

That end of the tapered part 19 of the link 11 projecting beyond the slot 14 is now bent away from the end 12 of the main body 10 and then bent back over upon itself until said end engages upon the other end 13 of said main body 10. This bending over of said link end can be readily accomplished with a hammer, the two spaced ends 12 and 13 being securely connected together so that the hose end is tightly clamped to the nipple 21. After said link end 19 has been folded or bent over, as before described, the extreme end thereof will lie between the two ears 18—18 on the other end of said link, which ears are then bent down to engage upon and securely hold said end in this position, as shown in Fig. 1. In forming the ears 18—18, the ends thereof are offset so that they will lay flat upon the link end 19 and will not overlap each other. The flanges 15 and 17 on the body ends 12 and 13 projecting radially as they do beyond the link end 19 protect the link end from becoming caught upon some object and thus become loosened, and said end is further protected by the bent-over ears 18—18.

Should it be found necessary to remove the clamp from a hose end, the ears 18—18 are bent upwardly away from the link end 19 which is in turn bent back to its original shape so that it can move a short distance through the slot 14, the two ends 12 and 13 spreading apart to their normal position. The nipple can then be removed and the clamp as a whole slipped off the end of the hose. When the clamp is again used, the old link is discarded and a new link used in its stead, which link is applied as before mentioned.

It is apparent from the foregoing description that my improved hose clamp comprises but two parts which rigidly secures a hose end to a nipple, or the like. Thus there are no parts such as screws and nuts to become loosened or lost. The bent over ears protects the bent over ends of the links from being caught or otherwise engaged and thus loosened with attending failure of the purpose of the clamp. It may be easily applied and may be made from sheet metal at a comparatively low cost and is indeed efficient for its intended purpose.

While in describing my invention I have referred to certain details of construction and arrangement of parts, I do not wish to be limited thereto except as may be pointed out in the appended claims.

I claim as my invention:

1. A hose clamp comprising in combination an annular body member split to provide two spaced ends, one of which has an opening therein, and a link for connecting said ends together, said link having ears at one end and a tongue at the other end, the eared end of said link operatively engaging the other end of said body member with the ears on the outside thereof, the tongue end of said link being adapted to be inserted through the opening in the first named end of the body member from the inside thereof, and to thereafter be bent over upon said other end of said body member.

2. A hose clamp comprising in combination an annular body member split to provide two spaced ends, one of which has an opening therein and a link for connecting said ends together, said link having ears at one end and a tongue at the other end, the eared end of said link operatively engaging the other end of said body member with the ears on the outside thereof, the tongue end of said link being adapted to be inserted through the opening in the first named end of the body member from the inside thereof, and to thereafter be bent over upon said other end of said body member, and to be locked in this position by said ears which are adapted to be bent over upon said bent over end of said link.

3. A hose clamp comprising in combination, an annular body split to provide two spaced ends each of which has an opening therein and a link for connecting said ends together, said link having an ear at one end and a tongue at the other end, said ear being operatively engaged in the opening in one end of said body and the tongue end of said link being adapted to be inserted through the opening in the other end of said body and to then be bent over upon said first mentioned end of said body to overlap the eared end of the link.

4. A hose clamp comprising in combination, an annular body member split to provide two spaced ends, means providing oppositely facing shoulders on said ends to receive a tool for drawing said ends toward each other, one of said ends having an opening therein, and a link for connecting said ends together after they have been drawn toward each other, said link having an ear at one end and a tongue at the other end, the eared end of the link operatively engaging the other end of the body member with the ears on the outside thereof, the tongue end of said link being adapted to be inserted through the opening in the first named end of the body member from the inside thereof, and to thereafter be bent over upon said other end of said body member.

5. A hose clamp comprising in combination, an annular body member having two spaced ends, one of said ends having two arcuate slots therein and the other end having a transverse opening therein, and a link for connecting said ends together, said link having two radially disposed ears at one end adapted to be inserted in said arcuate slots in one end of the body member from the inside thereof and the other end of said link being adapted to be inserted through the transverse opening in the other end of said body member from the inside thereof and to then be bent over upon said first mentioned end after which said ears are bent toward each other to engage upon said bent over end of said link.

In testimony whereof, I have hereunto set my hand, this 12 day of March, 1924.

MELVIN M. FARMER.